United States Patent
Sadanaga (10) Patent No.: US 9,979,268 B2
(45) Date of Patent: May 22, 2018

(54) MOTOR

(71) Applicant: Panasonic Intellectual Property Management Co., Ltd., Osaka (JP)

(72) Inventor: Yuichiro Sadanaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 116 days.

(21) Appl. No.: 15/121,329

(22) PCT Filed: Jul. 29, 2015

(86) PCT No.: PCT/JP2015/003810
§ 371 (c)(1),
(2) Date: Aug. 24, 2016

(87) PCT Pub. No.: WO2016/017165
PCT Pub. Date: Feb. 4, 2016

(65) Prior Publication Data
US 2017/0019007 A1    Jan. 19, 2017

(30) Foreign Application Priority Data

Aug. 1, 2014    (JP) ................................ 2014-157523

(51) Int. Cl.
*H02K 29/08* (2006.01)
*H02K 7/08* (2006.01)
(Continued)

(52) U.S. Cl.
CPC ............ *H02K 29/08* (2013.01); *G01D 5/145* (2013.01); *G01D 11/245* (2013.01); *H02K 1/14* (2013.01);
(Continued)

(58) Field of Classification Search
CPC ........ H02K 29/08; H02K 11/00; H02K 11/21; H02K 1/14; H02K 1/27; H02K 7/083;
(Continued)

(56) References Cited

U.S. PATENT DOCUMENTS 4,988,905 A * 1/1991 Tolmie, Jr. ............. H02K 29/06
310/68 B
5,945,766 A   8/1999 Kim et al.
(Continued)

FOREIGN PATENT DOCUMENTS

| JP | 57-025143 | 2/1982 |
|---|---|---|
| JP | 8-205506 | 8/1996 |

(Continued)

OTHER PUBLICATIONS

International Search Report of PCT application No. PCT/JP2015/003810 dated Sep. 29, 2015.

*Primary Examiner* — Alex W Mok
(74) *Attorney, Agent, or Firm* — McDermott Will & Emery LLP (57) ABSTRACT

A motor of the present invention includes a stator in which a coil is wound around a stator core, and a magnetic circuit unit having a rotor. The rotor holds a rotor magnet disposed facing the stator core and a sensor magnet for position detection with a rotation shaft in the center. The motor further includes an electronic circuit unit having a circuit board on which circuit components including a magnetic detection element are mounted, and a partition disposed between the magnetic circuit unit and the electronic circuit unit for separating their spaces. The motor has an auxiliary sensor magnet disposed facing the sensor magnet with the partition and the magnetic detection element in between. The auxiliary sensor magnet is fixed and supported by a (Continued)

rotatable auxiliary shaft disposed independent from and coaxial with the rotation shaft.

2 Claims, 5 Drawing Sheets

(51) Int. Cl.
    *H02K 11/21*         (2016.01)
    *H02K 1/27*          (2006.01)
    *H02K 1/14*          (2006.01)
    *G01D 5/14*          (2006.01)
    *G01D 11/24*        (2006.01)
    *H02K 11/215*      (2016.01)

(52) U.S. Cl.
    CPC ............... *H02K 1/27* (2013.01); *H02K 7/083* (2013.01); *H02K 11/21* (2016.01); *H02K 11/215* (2016.01)

(58) Field of Classification Search
    CPC ........ H02K 11/215; G01B 7/30; G01D 5/145; G01D 11/245
    USPC ....................................................... 310/68 B
    See application file for complete search history.

(56) References Cited

U.S. PATENT DOCUMENTS

| | | | |
|---|---|---|---|
| 6,424,061 | B1 | 7/2002 | Fukuda et al. |
| 8,397,883 | B2 * | 3/2013 | St. Clair ............... F16D 57/002 188/161 |
| 2011/0031851 | A1 * | 2/2011 | Uryu ..................... H02K 11/024 310/68 B |
| 2011/0169358 | A1 * | 7/2011 | Furukawa ............... H02K 3/522 310/89 |
| 2014/0009044 | A1 * | 1/2014 | Taniguchi .............. H02K 21/16 310/68 B |
| 2014/0246958 | A1 * | 9/2014 | Taniguchi .............. H02K 21/14 310/68 B |
| 2015/0022063 | A1 * | 1/2015 | Lei ..................... H02K 11/0073 310/68 B |

FOREIGN PATENT DOCUMENTS

| | | |
|---|---|---|
| JP | 9-327163 | 12/1997 |
| JP | 2001-086724 | 3/2001 |
| JP | 2005-160274 | 6/2005 |
| JP | 2007-221976 | 8/2007 |

* cited by examiner

MOTOR

CROSS-REFERENCE TO RELATED APPLICATIONS

This application is a U.S. national stage application of the PCT International Application No. PCT/JP2015/003810 filed on Jul. 29, 2015, which claims the benefit of foreign priority of Japanese patent application 2014-157523 filed on Aug. 1, 2014, the contents all of which are incorporated herein by reference.

TECHNICAL FIELD

The present invention relates to motors having a magnetic detection element for detecting a rotor position, and more particularly to structures for detecting the rotor position of the motor.

BACKGROUND ART

Electric vehicles have been increasingly advanced, and the number of electric motors installed in vehicles has also been increasing year by year. In line with this trend, a control function needed for each motor is also becoming more sophisticated. The use of brushless motors for vehicles has thus been rapidly expanding.

To control smooth rotation of motor, a brushless motor needs to identify the position of rotor. For this purpose, a conventional motor has a main field magnet and a sensor magnet for detecting rotor position on a motor rotation shaft, and a magnetic detection element is disposed on a circuit board as a magnetic detection means. This is a known general structure for detecting the rotor position.

Figure 4:
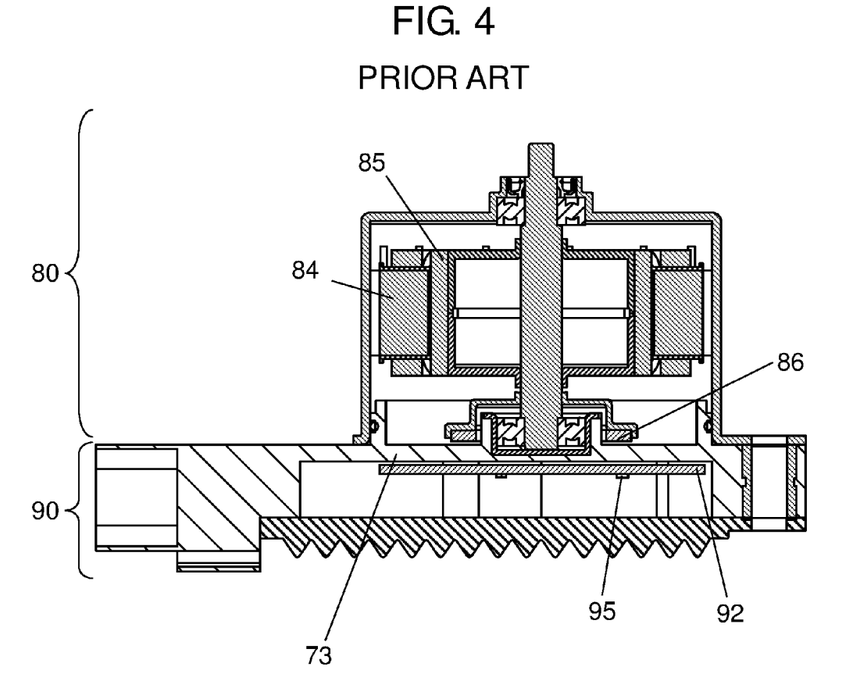
FIG. 4 is a sectional view of an example of a conventional brushless motor.
Figure 5:
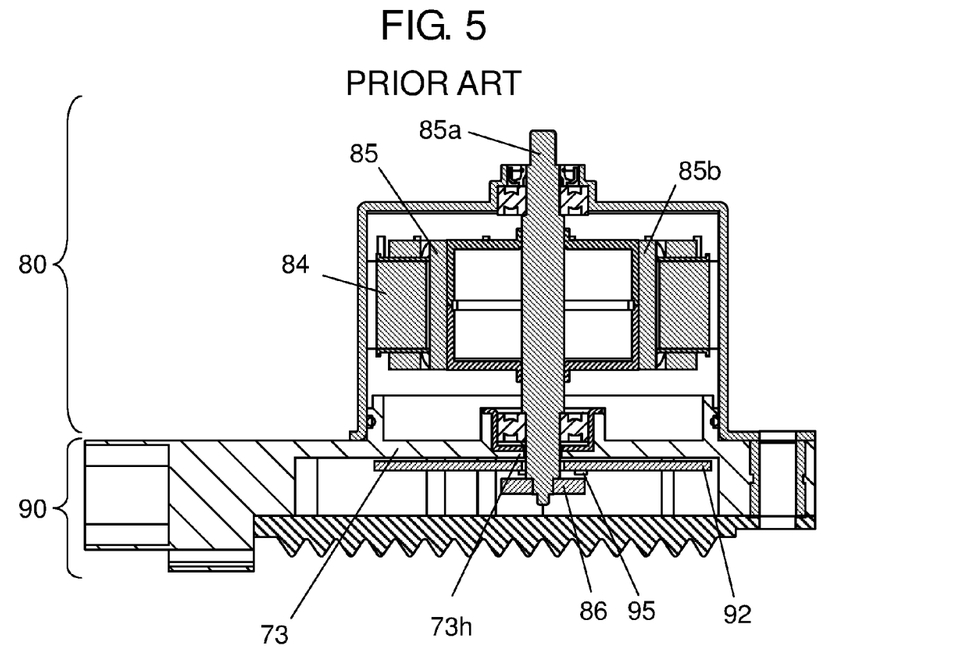
FIG. 5 is a sectional view of another example of the conventional brushless motor.
Figure 6:
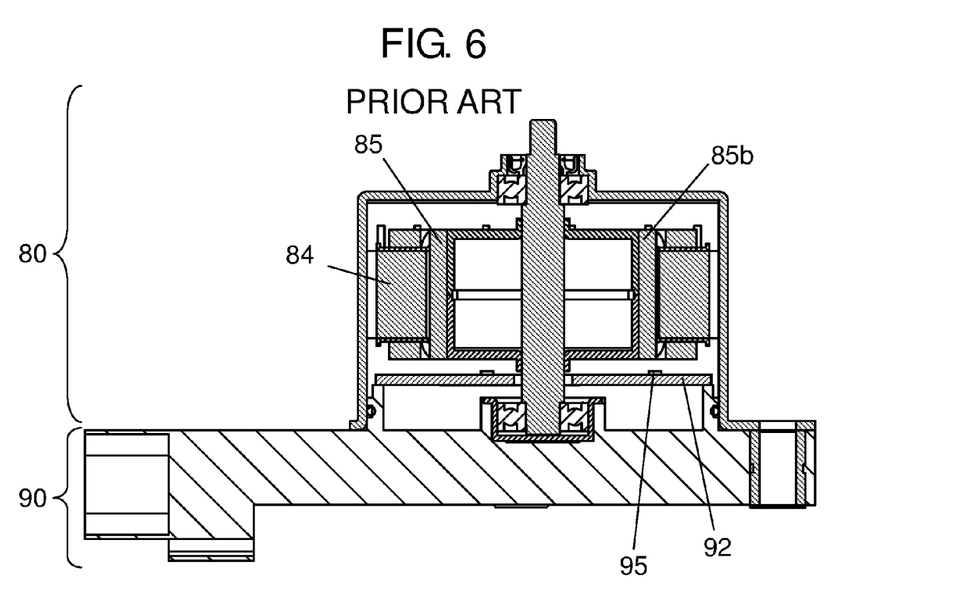
FIG. 6 is a sectional view of still another example of the conventional brushless motor.

FIG. 4, FIG. 5, and FIG. 6 are sectional views illustrating examples of a structure of the conventional brushless motor having the above structure for detecting the rotor position.

The conventional brushless motor in FIG. 4 includes magnetic circuit unit 80 including stator 84 and rotor 85, electronic circuit unit 90 including an electronic circuit and a component housing the electronic circuit, and partition 73 for separating spaces of magnetic circuit unit 80 and electronic circuit unit 90. This brushless motor has a structure for detecting the rotor position such that sensor magnet 86 for detecting the position of rotor 85 is disposed facing magnetic detection element 95, which is a means for detecting magnetism, disposed on circuit board 92 in electronic circuit unit 90 with partition 73 in between.

In the conventional brushless motor in FIG. 5, through hole 73h for passing motor rotation shaft 85 through partition 73 is created, and sensor magnet 85 for detecting the position of rotor 85 is held at a tip of rotation shaft 85a passing through this through hole 73h. The brushless motor has a structure for detecting the rotor position such that sensor magnet 86 is disposed facing magnetic detection element 95, which is a means for detecting magnetism, disposed on circuit board 92 in electronic circuit unit 90.

In a brushless motor in FIG. 6 disclosed in PTL1, magnetic circuit unit 80 and electronic circuit unit 90 exist in the same space, and the partition is eliminated. This brushless motor has a structure for detecting the rotor position such that one end face of main field magnet 85b of rotor 85 faces magnetic detection element 95, which is a means for detecting magnetism, disposed on circuit board 92.

In a motor used under the high-temperature environment such as for vehicles, it is essential to protect electronic components mounted on the circuit board, including the magnetic detection element, from an influence of heat. In particular, it is important to place a motor used near an engine compartment of vehicle (environment whose surrounding temperature is 90° C. or above) in a position that the electronic components are less exposed to heat generated from the motor magnetic circuit unit, such as a coil. In other words, in the conventional brushless motor as configured above, the electronic components, including magnetic detection element 95, mounted on circuit board 92 need to be protected from an influence of heat generated by magnetic circuit unit 80.

Still more, magnetic detection element 95 disposed on circuit board 92 requires a relative positional accuracy to a rotor magnetic pole, in order to detect rotor magnetism generated by sensor magnet 86 and output a voltage corresponding to a strength of magnetism.

To further protect the electronic components from the heat generated by magnetic circuit unit 80 under the above high-temperature environment, the partition is thickened to prevent heat transfer to electronic circuit unit 90 in the conventional brushless structure in FIG. 4. However, this has a risk that a magnetic flux generated by sensor magnet 86 may not reach magnetic detection element 95, failing to interlink. A strong magnetic force is thus needed, resulting in increasing the cost.

In the structure of the conventional brushless motor in FIG. 5, sensor magnet 86 and rotor 85 cannot be assembled simultaneously in an assembly process. Therefore, a separate magnetizing process needs to be provided for magnetizing main field magnet 85b and sensor magnet 86 of rotor 85. This may degrade the accuracy for detecting the rotor position. Furthermore, through hole 73h created in partition 73 makes heat enter electronic circuit unit 90, and thus the electronic components, including magnetic detection element 95, mounted on circuit board 92 are affected by the heat. Reliability of electronic circuit unit 90 may thus degrade. Creation of the through hole in circuit board 92 also reduces a mounting area of electronic components and flexibility in circuit pattern design. This may enlarge the size of equipment.

In the structure of the brushless motor of PTL1 shown in FIG. 6, no partition for heat insulation is provided. An influence of heat from magnetic circuit unit 80 directly affects the electronic components, and thus reliability of electronic circuit unit 90 may degrade. In particular, magnetic detection element 95, such as a hall element, largely changes its characteristic by heat. Magnetic detection element 95 itself may be damaged by heat and cause erroneous operation due to functional failure, in addition to a concern of degraded positional accuracy.

CITATION LIST

Patent Literature

PTL1 Japanese Patent Unexamined Publication No. 2007-221976

SUMMARY OF THE INVENTION

A motor of the present invention includes a stator in which a coil is wound around its stator core, and a magnetic circuit unit having a rotor holding a rotor magnet disposed facing the stator core and a sensor magnet for position detection with a rotation shaft in the center. The motor further includes an electronic circuit unit having a circuit board on which circuit components including a magnetic detection element are mounted, and a partition disposed between the magnetic circuit unit and the electronic circuit unit to separate spaces of both units. In the motor, the magnetic detection element disposed on the circuit board is disposed facing the sensor magnet with the partition in between, and an auxiliary sensor magnet is disposed facing the sensor magnet with the partition and the magnetic detection element in between. The auxiliary sensor magnet is fixed and supported by a rotatable auxiliary shaft independent from and coaxial with the rotation shaft.

This structure enables to sufficiently interlink magnetic flux generated from the sensor magnet across the magnetic detection element. Accordingly, an inexpensive magnet can be used without using an expensive magnet with strong magnetic force, and thus a cost increase can be suppressed.

The main magnet and the sensor magnet can be magnetized simultaneously to secure accuracy of the magnetic pole. Equipment with good positional accuracy can thus be provided. The electronic components mounted on the circuit board, including the magnetic detection element, are further less thermally affected. Accordingly, reliability of the electronic circuit unit can be improved.

DESCRIPTION OF EMBODIMENTS

An exemplary embodiment of the present invention is described below with reference to drawings.

A motor used near an engine compartment of vehicle is, for example, employed in an electric oil pump for supplying operating oil and lubricating oil to an oil pressure control device of automatic transmission. A brushless motor for the electric oil pump used in vehicles is described below as an example of the motor in the exemplary embodiment.

Exemplary Embodiment

Figure 1:
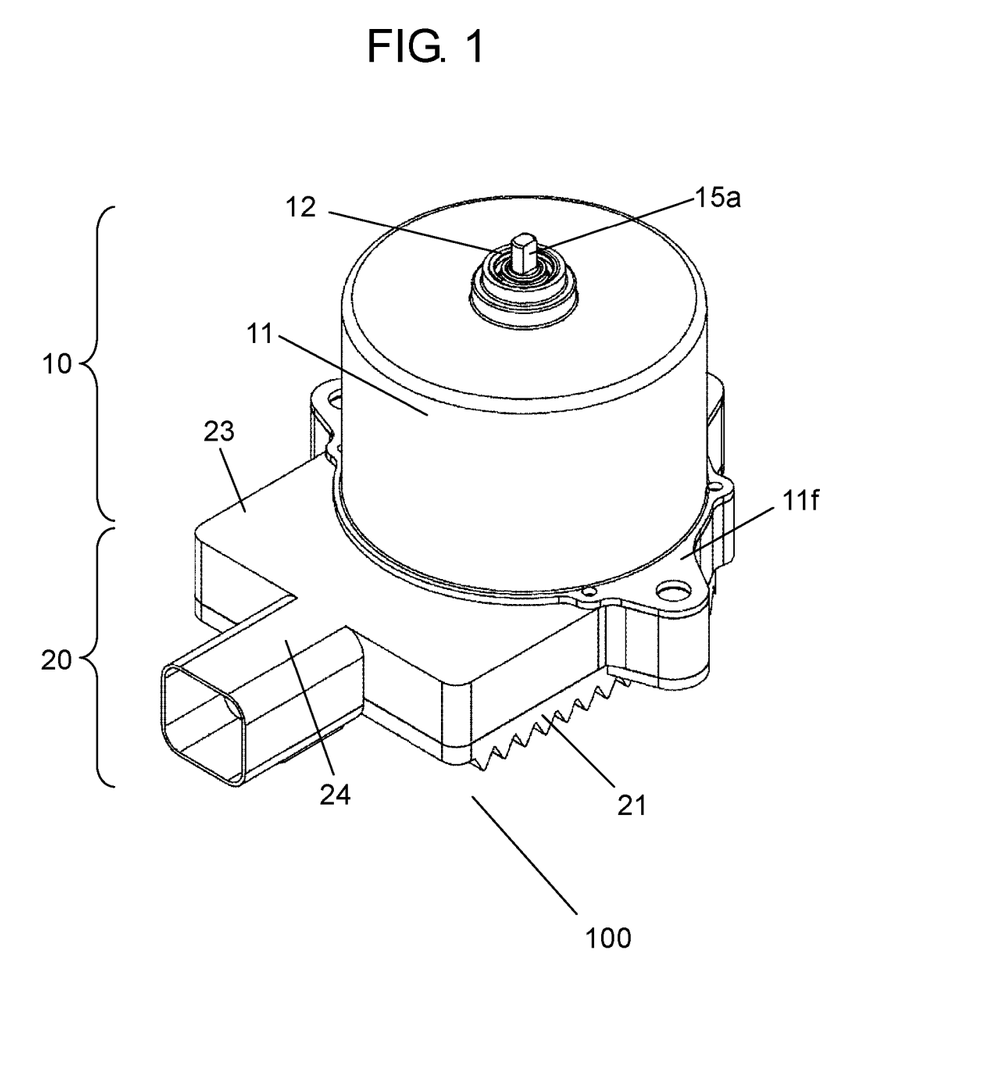
FIG. 1 is a perspective appearance view of a motor in accordance with an exemplary embodiment of the present invention.
Figure 2A:
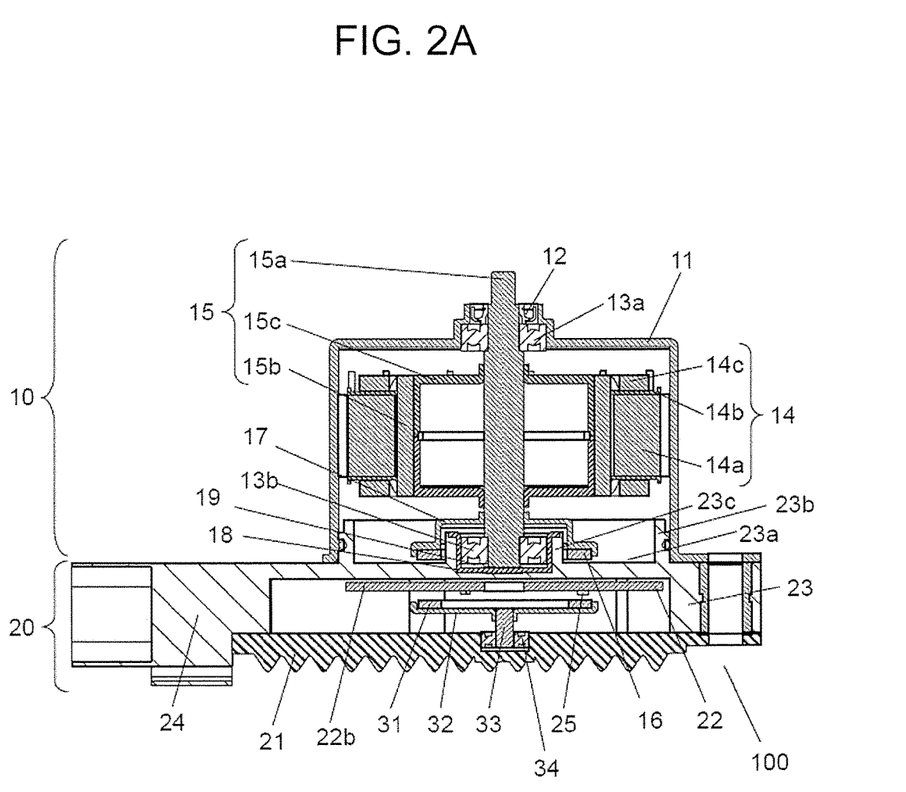
FIG. 2A is a sectional view of the motor in accordance with the exemplary embodiment of the present invention.

FIG. 1 is a perspective view of an appearance of motor 100 in the exemplary embodiment of the present invention. FIG. 2A is a side sectional view of motor 100 in the exemplary embodiment of the present invention.

As shown in FIG. 1 and FIG. 2A, motor 100, which is a brushless motor, includes brackets 23, motor frame 11 disposed on one side of bracket 23, and bottom plate 21 disposed on the other side of bracket 23. Details are descried below. Stator 14 with coil and rotor 15 with permanent magnet that rotates around a rotation shaft are housed in motor frame 11, and these magnetic components configure magnetic circuit unit 10. As shown in FIG. 1, rotation shaft 15a protrudes from a top face of motor frame 11 via oil seal 12 as an output shaft. A motor function is achieved by the rotation of this rotation shaft 15a. Circuit board 22 on which electronic components described later are mounted is housed in bracket 23. These electronic components configure electronic circuit unit 20. Bracket 23 has connector 24 for supplying a power source and signal to circuit board 22. Bottom plate 21 with a heat dissipation fin for releasing heat from the electronic components is disposed on the bottom of bracket 23.

First, magnetic circuit unit 10 housed in motor frame 11 and bracket 23 is described. Motor frame 11 is made of an iron sheet and has a substantially cylindrical shape with space inside. One side is a top face, and motor frame 11 has an opening that is open on the other side, which is the bottom. Flange 11f extending from the opening to the outer peripheral side is provided on motor frame 11 to assemble with resin bracket 23. Motor frame 11 and resin bracket 23 are fitted and fixed by a means, such as press-fitting and screwing. In magnetic circuit unit 10, bearing 13a and oil seal 12 are held on the output shaft side of motor frame 11 where rotation shaft 15a protrudes. Stator 14 is press-fitted and fixed in an inner-diameter part of motor frame 11, and rotor 15 is rotatably housed via a gap.

Stator 14 includes stator core 14a, insulator 14b, and coil 14c. Stator core 14a is formed by, for example, laminating multiple steel sheets, and has multiple salient poles protruding to the inner periphery side. Coil 14c is wound around each salient pole via insulator 14b formed typically of insulating resin. Wound coil 14c is three-phase winding, and a wide range of winding patterns exist based on the number of poles of rotor magnet 15b described later.

Rotor 15 includes cylindrical rotor magnet 15b, substantially cup-like rotor frame 15c, and rotation shaft 15a passing through the inner periphery side of rotor frame 15c. Rotor magnet 15b is formed of a permanent magnet, and is bonded and fixed onto rotor frame 15c. Rotor magnet 15b has magnetic poles in which N pole and S pole are alternately disposed. For example, rotor magnet 15b is magnetized to 8 or 10 magnetic poles. Rotor frame 15c is made of an iron sheet formed into substantially a cup shape. Two rotor frames 15c are disposed in opposite directions relative to the shaft so that they face each other. Rotor shaft 15a is press-fitted and fixed in an inner-diameter hole of rotor frame 15c. Rotor frame 15c is also a back yoke of rotor magnet 15b, and configures a part of a magnetic path. Rotation shaft 15a is made of metal, such as iron, and is rotatably supported by bearing 13a on the output side and bearing 13b on the anti-output side. Rotation shaft 15a has a role of transmitting an output of the rotation of motor 100 to destination equipment, such as an oil pump.

A tip of rotation shaft 15a at the output side is processed to D-cut (processing of cylinder into D shape) or two-face width (processing of cylinder to two faces parallel to each other) for connection with the destination equipment.

Figure 2B:
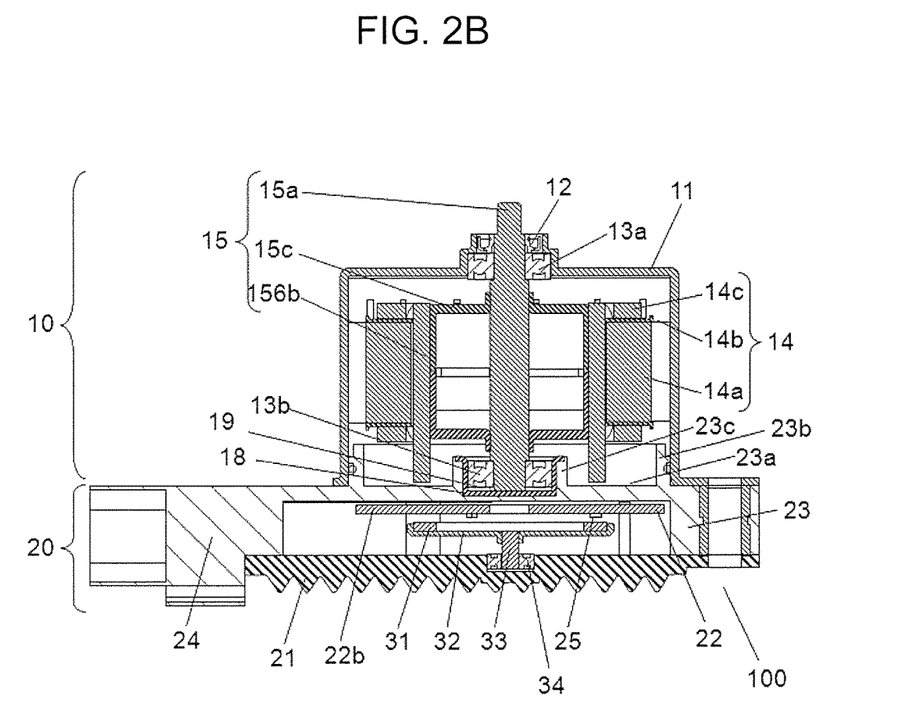
FIG. 2B is a sectional view of the motor in accordance with an example that comprises magnet 156b which is integrally forming the sensor magnet and the rotor magnet.

On the side of magnetic circuit unit 10 of bracket 23, sensor magnet holder 17 made of disc-like metal is fixed on the anti-output side of rotation shaft 15a for positioning and retaining sensor magnet 16. Sensor magnet 16 is bonded and fixed on this sensor magnet holder 17. This sensor magnet 16 is a permanent magnet magnetized in a magnetic pole pattern same as rotor magnet 15b. The rotation position of rotor 15 is detected by detecting magnetism of sensor magnet 16 by the magnetic detection element. This will be detailed later. This sensor magnet holder 17 also rotates with rotor 15 around rotation shaft 15a. Here, sensor magnet holder 17 rotates such that sensor magnet 16 moves in a circumferential direction while facing the surface on the side of magnetic circuit unit 10 of bracket 23 at a certain distance. Depending on the motor structure, the rotor magnet may be used as a sensor magnet for detecting the position of rotor 15, or the rotor magnet and sensor magnet may be integrally formed. FIG. 2B is a figure that shows an example of such magnet 156b which is integrally forming the sensor magnet and the rotor magnet.

Next is described electronic circuit unit 20 including circuit board 22 between bottom plate 21 and bracket 23.

Bottom plate 21 is formed of aluminum die-cast. To release heat generated from electronic component 22a on circuit board 22, substantially-triangular consecutive heat dissipation fins are provided on bottom plate 21.

Bracket 23 is formed of a thermoplastic resin material having electric insulation. More specifically, resin bracket 23 uses a thermoplastic resin material with electrical insulation consisting of polyphenylene sulfide resin (hereafter referred to as PPS resin). Bracket in the exemplary embodiment is formed by insert-molding for integrating a range of components inside, which is described later.

By forming bracket 23 using PPS resin, thin molding becomes feasible, and thus design flexibility in shape improves. In addition, PPS resin has good moldability that leads to less sink mark and stable dimensions even though components are housed. Furthermore, high productivity by short tact time can be secured at reasonable cost. PPS resin also has good heat resistance.

Bracket 23 has closed top, open bottom, and space inside. It has a structure like a thin box in the shaft direction. The top of bracket 23 is covered with flat sheet 23a extending in a flat sheet. On the side of magnetic circuit unit 10, motor frame receiver 23b for receiving motor frame 11 and bearing receiver 23c for receiving bearing 13b are formed protruding from flat sheet 23a to the side of magnetic circuit unit 10. Bottom plate 21 and PPS resin bracket 23 are fixed typically by screwing on the bottom side of bracket 23. Circuit board 22 is housed in a space inside bracket 23 closed by bottom plate 21 like a cover.

General electronic components such as chip components, including IC or microcomputer, resistor, and capacitor, are mounted on board 22b of circuit board 22. These electronic components configure a driving circuit for supplying power and driving coil 14c of stator 14. In addition, as shown in FIG. 2A, hall element 25 is mounted as a magnetic detection means on circuit board 22 in a way such that it faces sensor magnet 16 with bracket 23 in between. Hall element 25 is disposed on circuit board 22 in this way, and detects a magnetic pole of sensor magnet 16 magnetized corresponding to each magnetic pole of rotor magnet 15b.

Next is detailed bracket 23 that houses circuit board 22, and structurally separates magnetic circuit unit 10 and electronic circuit unit 20.

PPS resin bracket 23 formed in this way is provided with a spigot that has a fitting shape for positioning, so as to fit and fix motor frame 11, on the side of magnetic circuit unit 10 for inserting bearing 13b. This secures a coaxial position with magnetic circuit unit 10.

In addition, metal cup 18 is integrally formed by insert-molding on bearing receiver 23c on the side of magnetic circuit unit 10. Bracket 23 holds and fixes bearing 13b by this metal cup 18 formed in this way. Bearing 13b and metal cup 18 are formed of same type of iron metal. Since there is no relative change in dimensions due to a difference in thermal expansion rate, creeping can be prevented. Waveform washer 19 for preloading rotor 15 is inserted between bearing 13b and metal cup 18.

PPS resin bracket 23 at the side of electronic circuit unit 20 also acts as a circuit holder for mechanically holding and fixing circuit board 22. Circuit board 22 is fused or screwed for fixing. As electrical connection components, bus bars for three phases that connect lead wires of three phases from coil 14 with circuit board 22, power supply terminal, and signal terminal are disposed on resin PPS bracket 23, securing electrical insulation. Bracket 23 in the exemplary embodiment is insert-molded while housing these bus bars and power supply terminal inside.

A nut for mechanically connecting and fixing motor frame 11 and bottom plate 21 is also housed inside PPS resin bracket 23 for insert-molding. By housing these metal terminals and connection components in PPS bracket 23 for insert-molding, the number of components and the number of assembly man-hours can be reduced. In addition, the power supply terminal and signal terminal are provided to connector 24 and integrally molded with PPS resin bracket 23 for direct connection that allows easy external electrical connection. Direct connection can prevent disconnection due to bending of lead wire for external connection and degradation in sealing inside the motor. Accordingly, highly-reliable connection can be achieved.

In the exemplary embodiment, bracket 23 is formed of electrically-insulating resin, as described above. This prevents short-circuiting between magnetic circuit unit 10 and electronic circuit unit 20. Since magnetic circuit unit 10 has coil 14c, an amount of heat generated from coil 14c is large. In the exemplary embodiment, bracket 23 is disposed in between to spatially separate magnetic circuit unit 10 and electronic circuit unit 20, in order to protect circuit components of electronic circuit unit 20 from the heat of magnetic circuit unit 10. In other words, bracket 23 is disposed between magnetic circuit unit 10 and electronic circuit unit 20 as a partition to suppress transfer of heat from coil 14c of stator 14 to electronic components on circuit board 22.

In particular, in the exemplary embodiment, bearing 13b inserted in metal cup 18 disposed on bracket 23 at the side of magnetic circuit unit 10 receives the anti-output shaft side of rotation shaft 15a. In other words, rotation shaft 15a does not pass through bracket 23. No through hole is thus created in bracket 3. With this structure, heat transfer via the through hole is also suppressed in the exemplary embodiment.

Furthermore, heat transfer can be suppressed by thickening bracket 23. On the other hand, however, magnetic detection accuracy may also degrade by increasing the thickness when the magnetic detection element is mounted on the circuit board to detect position and speed of the rotor, as described in Background Art. In other words, when hall element 25 faces sensor magnet 16 with bracket 23 in between, such as in this exemplary embodiment, a magnetic force that hall element 25 receives weakens as a distance between hall element 25 and sensor magnet 16 becomes large. This may degrade the position detection accuracy.

Therefore, in the exemplary embodiment, auxiliary sensor magnet 31, as shown in FIG. 2A, is further disposed on bracket 23 at the side of electronic circuit unit 20. Auxiliary sensor magnet 31 is a permanent magnet magnetized to the same pole and same position as sensor magnet 16. This auxiliary sensor magnet 31 is disposed facing sensor magnet 16 with bracket 23 and hall element 26 mounted on circuit board 22 in between. Auxiliary sensor magnet 31 is bonded and fixed onto disc-like auxiliary sensor magnet holder 32 made of iron sheet. Auxiliary sensor magnet holder 32 is press-fitted and fixed onto auxiliary shaft 33 rotatably supported by auxiliary bearing 34 fixed on bottom plate 21. This auxiliary shaft 33 protrudes from bottom plate 21 toward bracket 23 in a coaxial manner with rotation shaft 15a relative to the same center axis.

Figure 3A:
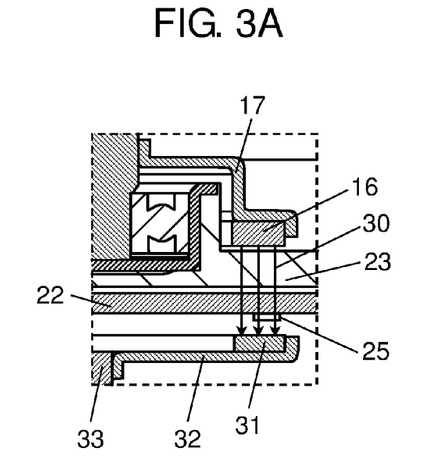
FIG. 3A is a magnified sectional view of a magnetic flux interlinkage part of the motor in accordance with the exemplary embodiment of the present invention.
Figure 3B:
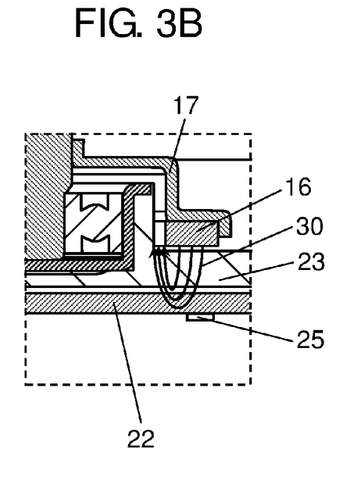
FIG. 3B is a magnified sectional view of a magnetic flux interlinkage part of a conventional motor for comparison with FIG. 3A.

FIG. 3A is a magnified sectional view of magnetic flux interlinkage part in the exemplary embodiment of the present invention. It illustrates a sectional view that hall element 25 is sandwiched by sensor magnet 16 and auxiliary sensor magnet 31. For comparison, FIG. 3B is a magnified sectional view of the magnetic flux interlinkage part of the conventional motor. It is a sectional view when no auxiliary sensor magnet 31 is disposed.

It is apparent from FIG. 3B that magnetic flux 30 generated from sensor magnet 16 is not sufficiently interlinked with hall element 25 as hall element 25 becomes far from sensor magnet 16 when only sensor magnet 16 is provided.

Conversely, in FIG. 3A, magnetic flux 30 that links both magnets is generated by disposing auxiliary sensor magnet 31 such that auxiliary sensor magnet 31 faces sensor magnet 16. Therefore, the structure shown in FIG. 3A achieves sufficient interlinkage of magnetic flux 30 generated from sensor magnet 16 across hall element 25 even when hall element 25 becomes far from sensor magnet 16. The position detection accuracy can thus be retained. Sensor magnet 16 and auxiliary sensor magnet 31 are mutually magnetized in the same pole and same position, and both are rotatably supported. Therefore, different poles of both magnets attract each other. For example, the S pole of sensor magnet 16 and the N pole of auxiliary sensor magnet 31 are disposed to face each other. This state is same during rotation. Accordingly, auxiliary sensor magnet holder 32 rotates in line with the rotation of rotor 15. In other words, auxiliary sensor magnet holder 32 rotates synchronized with rotor 15.

In particular, for a motor used near an engine compartment of vehicle (environment in which surrounding temperature is 90° C. or higher), bracket 23 that becomes a partition needs to be thickened to prevent transfer of heat generated in magnetic circuit unit 10 to electronic circuit unit 20. To fulfil this demand, auxiliary sensor magnet 31 as described above is provided in the exemplary embodiment. A magnetic flux generated from sensor magnet 16 can thus be sufficiently interlinked with hall element 25 as a magnetic detection means. In addition, good magnetic pole accuracy and resulting accuracy of motor rotation position can be secured because rotor magnet 15b and sensor magnet 16 can be simultaneously magnetized.

Accordingly, the use of the above exemplary embodiment achieves a motor that can secure good positional accuracy and reliability of electronic components while suppressing a cost increase.

INDUSTRIAL APPLICABILITY

A motor of the present invention can improve the position detection accuracy of the rotor, and thus it is applicable to industrial motors and motors for electric home appliances, in addition to vehicle motors. In particular, the present invention is effectively applicable to motors that require high reliability under the high-temperature environment.

The invention claimed is:

1. A motor comprising:
a magnetic circuit unit including a stator in which a coil is wound around a stator core, and a rotor holding a rotor magnet disposed facing the stator core and a sensor magnet for position detection with a rotation shaft in a center;
an electronic circuit unit having a circuit board on which a circuit component including a magnetic detection element is mounted; and
a partition disposed between the magnetic circuit unit and the electronic circuit unit for separating spaces of the magnetic circuit unit and the electronic circuit unit,
wherein
the magnetic detection element disposed on the circuit board aligns with the sensor magnet with the partition in between,
an auxiliary sensor magnet is disposed facing the sensor magnet with the partition and the magnetic detection element in between, and
the auxiliary sensor magnet is fixed and supported by a rotatable auxiliary shaft disposed independent from and coaxial with the rotation shaft.

2. The motor of claim 1, wherein the sensor magnet and the rotor magnet are integrated.

* * * * *